May 12, 1959 — S. HALBRON — 2,886,156
ROLLERS FOR CONVEYORS

Filed Dec. 19, 1957 — 3 Sheets-Sheet 1

INVENTOR
SERGE HALBRON
BY Irwin S. Thompson
ATTY.

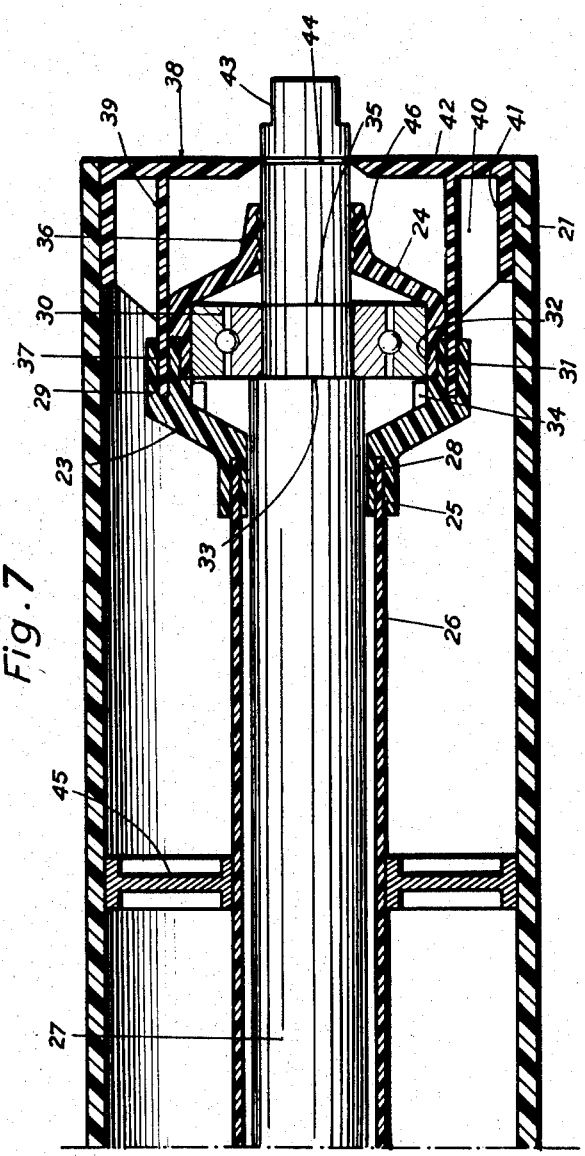

May 12, 1959 S. HALBRON 2,886,156
ROLLERS FOR CONVEYORS
Filed Dec. 19, 1957 3 Sheets-Sheet 3
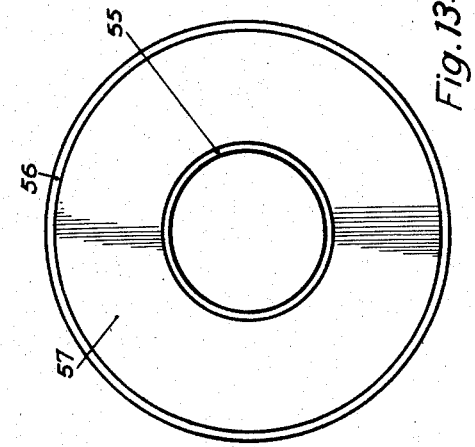
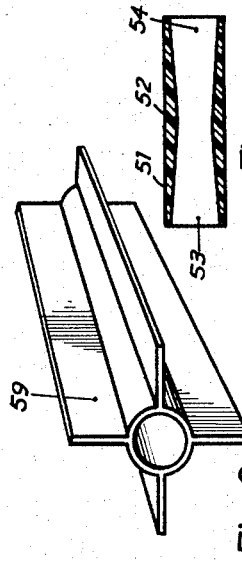
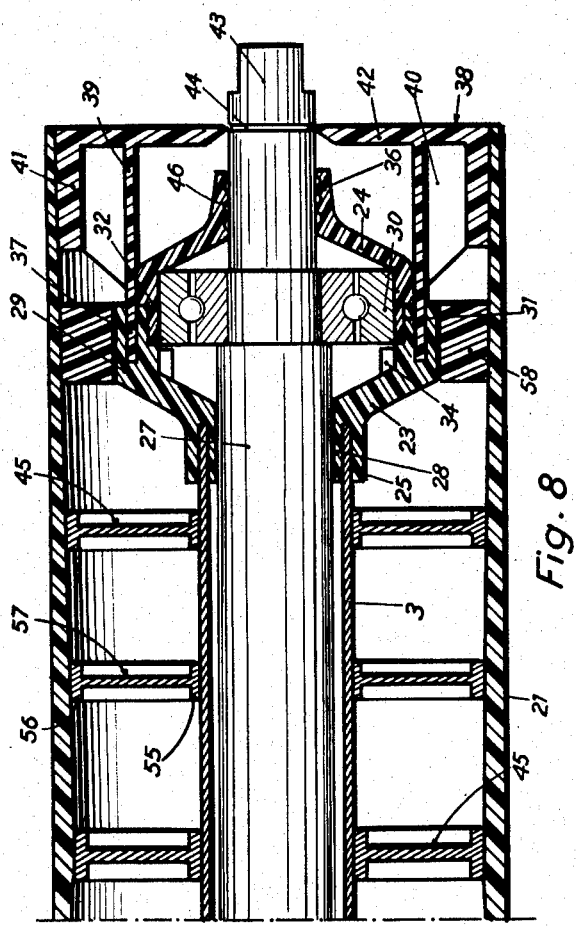
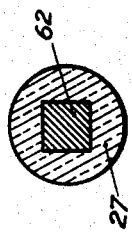
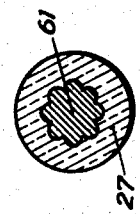
INVENTOR
SERGE HALBRON
By Irwin S. Thompson
ATTY.

United States Patent Office 2,886,156
Patented May 12, 1959

2,886,156

ROLLERS FOR CONVEYORS

Serge Halbron, Marseille, France

Application December 19, 1957, Serial No. 703,978

Claims priority, application France December 28, 1956

8 Claims. (Cl. 193—37)

The present invention relates generally to rollers for conveyors and particularly for belt conveyors.

Such rollers are usually made of metal so that their weight is fairly heavy and the energy which is required for starting and driving them is not proportional to the load being conveyed.

An object of the invention is to provide a new or improved roller for a conveyor which is altogether light and sufficiently strong for properly withstanding mechanical strains.

Viewed in a general aspect, the invention is embodied in a conveyor roller comprising a cylindrical envelope or casing sustained by at least two supporting elements made of a plastic material in which are formed recesses for accommodating bearings which are protected from the outside by covering elements, said supporting elements being interconnected by a bracing tube also made of a plastic material through which the roller shaft is engaged for free rotation.

According to a suitable constructional form of the roller provided by the invention, the cylindrical envelope or casing is supported by at least two hub members made of a plastic material in which are formed outwardly opened recesses adapted to receive bearings which are protected by a tight covering washer, said hub members being interconnected by a bracing tube also made of a plastic material.

Another object of the invention is to provide a roller as aforesaid wherein the existence of an outer envelope or casing and hub members made of a plastic material permits a lighter roller to be obtained, and the required mechanical strength is obtained owing to the provision of the bracing tube which advantageously has a push fit in the hub members, thereby rigidifying the assembly.

According to a further constructional form of the invention, there is provided adjacent each end of the conveyor roller a pair of half shells made of a cast plastic material forming a case which accommodates a bearing, one of said half shells being adapted to the neighboring end of the bracing tube, while said case is operatively connected with an end supporting plate. The half shell carried by the bracing tube provides a bearing surface for the inner shaft of the roller, while the other half shell provides another bearing surface oppositely located to the first one with respect to the bearing, whereby the roller is abutted upon said shaft over three zones adjacent each extremity. Advantageously the last-named bearing surface has circular or helical grooves.

Advantageously also the roller shaft is provided with one or several shoulders ensuring correct axial positioning of the case. The end plate has a peripheral flange on which the casing is abutted, said casing forming the body of the roller, and an internal skirt member preferably connected to said flange by radial struts and united to the two half shells so as to ensure proper hold thereof in a perfectly concentric position with respect to the roller casing.

A further object of the invention is to provide a roller as aforesaid wherein the bracing tube increases the mechanical strength of the roller assembly and the provision of three axially offset bearing zones adjacent each extremity of the roller permits a perfect journalling action to be obtained. The lubricating grease is held in the case made up of the two cast half shells so that the roller can run for a very long time without requiring maintenance or overhaul. The end plate has a central aperture through which the roller shaft is engaged, the clearance being minimum the more so as a sealing lip and a groove are provided. A narrow gap is left between said aperture and the adjacent bearing surface for defining in said end plate a dust-collecting chamber for any dust that may have penetrated through said aperture, the particular shape of said bearing surface preventing any penetration of dust into the case.

A still further object of the invention is to provide a roller whose casing forming its body has a double conicity and its bore presents a slight taper from its middle portion toward its extremities. Such double conicity precludes any undue disengagement of the end plates responsive to the side strains which bear upon the roller while performing automatic centering of the roller casing upon its shaft. Bracing discs or fins are advantageously provided lengthwise of the roller for properly holding up the roller casing with respect to the bracing tube while enhancing the mechanical strength of the assembly. The roller elements are made of a plastic material and may be suitably made by injection moulding, whereby the weight of the roller is kept down within reasonable limits. The assembly is so conceived as to take into account those strains which bear upon the several elements for imparting it the desirable mechanical strength.

In the manufacture of rollers for so-called "transrollers" i.e. conveyors made up of a plurality of closely adjacent parallel rollers forming as it were a rolling surface, also in the manufacture of jockey rollers for the return stretch of a driving or conveying belt, the end portions of the rollers may be so constructed as to permit interconnection thereof in butt-to-butt or push fit relation, thereby making it possible to manufacture rollers of fairly considerable length exceeding the size of rollers made by a mere casting process. The mechanical strengths of elementary rollers are then so combined as to fulfil the conditions that are necessary in each instance.

With these and such other objects in view as will incidentally appear hereinafter, the invention comprises the novel construction and combination of parts that will be now described with reference to the accompanying drawings exemplifying the same and forming a part of the present disclosure and wherein:

Figure 1 is a partial axial sectional view of a roller constituting a first constructional embodiment of the invention.

Figures 2 to 6 inclusive are partial perspective views showing the several elements of which the roller is made up.

Figure 7 is a partial axial sectional view of a roller constituting another constructional embodiment of the invention.

Figure 8 is a view similar to Fig. 7 but showing a still further constructional form.

Figure 9 is a perspective view drawn to a smaller scale of a modification of the bracing tube fitted with longitudinal supporting fins.

Figures 10 to 12 are transverse sectional views showing three possible constructional forms of a roller shaft made of reinforced plastic material.

Figure 13 is a front view of a supporting disc.

Figure 14 is a longitudinal sectional view drawn to a smaller scale showing the double conicity of the roller casing.

Figure 1:
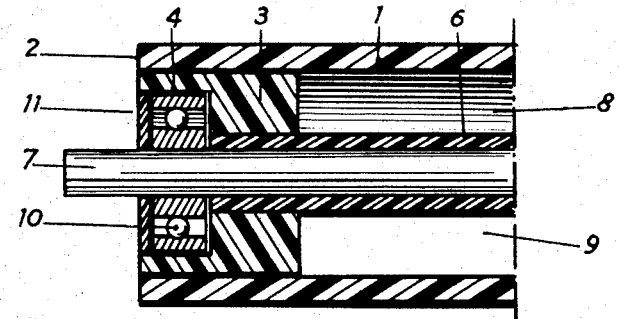
Figure 2:
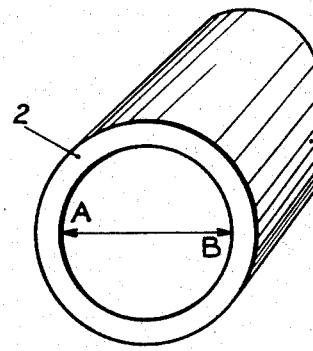
Figure 3:
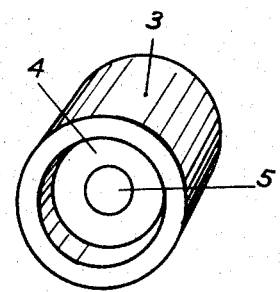
Figure 4:
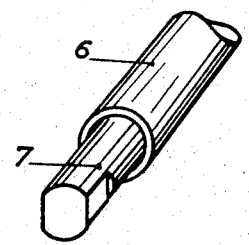
Figure 5:
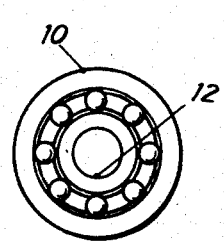
Figure 6:
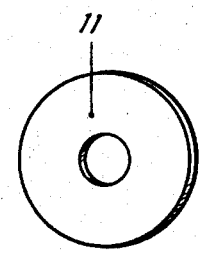

In the showing of Figs. 1 to 6 inclusive, the reference 1 designates the envelope or casing forming the body of the roller which is preferably made of a suitable plastic material. The end edge surfaces of the casing 1 which has a diameter: A—B are indicated at 2. Its thickness is chosen so as to match the mechanical strength to be obtained. Adjacent each end the roller casing contains a hub member 3 made of a suitable plastic material so shaped as to define an outwardly opened recess 4 and having a central bore 5 in which is held in push fit relation a bracing tube 6 also made of a plastic material, said tube 6 interconnecting the two end hub members of the roller. Through the tube 6 is engaged the shaft 7 about which the roller can rotate owing to a ball bearing 10 the inner race member 12 of which is mounted upon said shaft. The ball bearing 10 is fitted in the recess 4 and is protected from the outside by a washer 11 which performs a sealed closure. An annular space 8—9 is defined between the roller casing 1 and the bracing tube 6. It will be understood that such a roller is particularly light, while the mechanical combination between the casing 1 and the bracing tube 6 provides the required mechanical strength for withstanding the strains exerted by the conveyor band or belt to be obtained.

In the showing of Fig. 7, the roller casing is designated by 21, the bracing tube by 26 and the shaft by 27. As shown, the roller is mounted upon the shaft 27 adjacent its two ends through the medium of bearings 30. In the constructional form shown, each bearing 30 is accommodated in a housing or case formed by the juxtaposition of a pair of half shells 23, 24 made of a suitable plastic material and preferably produced by injection casting. The half shell 23 has a circular groove 25 formed in its hub member for the engagement of the neighboring end of the bracing tube 26. Said hub member forms a bearing surface 28 for the shaft 27. The rim portion 29 of said half shell 23 has a shoulder 31 for receiving a corresponding shoulder on the rim portion 32 of the other half shell 24. Said half shells may be united together in any appropriate fashion, for example by being glued together for forming a case accommodating the bearing 30 whose inner race member is abutted against a shoulder 33 on the shaft 27, while its outer race member is applied against abutments 34 carried by the half shell 23. Another shoulder 35 on the shaft 27 delineates the bearing 30 on the other side. The hub member 36 of the half shell 24 surrounds the shaft 27 while providing a further smooth bearing surface and is provided (as shown) with inner grooves which may be either circular or helical.

The end face of the rim portion 29 of the helf shell 23 is furthermore provided with a relatively deep groove 37 into which is frictionally held the end of a skirt member 39 integral with a supporting end plate 38 of circular shape whose flange 41 which is connected to the skirt member 39 by reinforcing struts 40 serves as an abutment element for the roller casing 21. The bottom 42 of the end plate 38 is provided with a central aperture through which is engaged the end 43 of the shaft 27. A lip 44 on the periphery of said aperture cooperates with a circular groove in the shaft 27 for performing as tight a sealing action as possible.

As shown in said figure, spaced supporting discs 45 are provided lengthwise of the roller for increasing its mechanical strength.

It will be seen from Fig. 7 that the roller rests upon the shaft 27 adjacent each extremity over three zones including a bearing 30 associated on each side with a bearing surface 28, 46. The bearing is axially held with respect to the shaft 27 and with respect to the half shells that form the case, thereby ensuring proper hold in position. The case made up of a pair of half shells constitutes with the supporting end plate 38 a rigid assembly which ensures a perfect centering of the roller casing.

The three zone application of the roller combined with the particular shape of the half shells and the supporting plate and the connection performed by the bracing tube provides a high mechanical strength of the assembly in spite of its small weight. All the parts of the rollers are so formed as to lend themselves to injection casting of plastic materials.

The case defined by the two half shells 23, 24 may be initially filled with lubricating grease. The latter cannot ooze out owing to the provision of grooves in the hub member 36 of the half shell 24, so that the roller may operate for a prolonged time without any need for upkeep or overhaul. Dust or other extraneous matter which may penetrate through the aperture in the supporting end plate 38 is subjected in the interval between the bottom of said plate 38 and the hub member 36 to the effect of an electrostatic field due to the nature of the parts that are made of a plastic material. This attracts and fixes inversely laden dust toward the periphery of the collecting chamber defined by said plate 38, the skirt member 39 and the half shell 24. Therefore such dust cannot reach the bearing 30.

In the constructional modification shown in Fig. 8, the roller casing 31 has a double conicity as clearly visible in Fig. 14. The middle portion 52 is the narrowest one and its bore is flared towards both ends as shown at 53, 54. Consequently, the supporting discs 45 have gradually increasing outer diameters outwardly from the middle of the roller. A disc of the type used, as seen in front face on Fig. 13, includes a pair of ring members 55, 56 united by a web portion 57. The double conicity of the roller casing ensures a perfect centering of the roller on the shaft and prevents any escapement with respect to the supporting end plates. Actually any axial effort exerted upon the roller casing having for its tendency to disengage the same from a supporting plate is compensated for by the wedging effect exerted upon the other end of the roller casing on the other supporting end plate.

Ring members 58 are provided about the half shell 23 for constituting an additional rest for the roller casing. The latter may be also supported from the bracing tube 26, by radially extending fins 59 extending over the whole or a portion of the length of said bracing tube.

Generally speaking the roller shaft 27 is made of steel but it may be also made of a plastic material, which itself may be reinforced by a metal core. As shown in Figs. 10 to 12, such core may have for example a cross-shaped transverse section as visible at 60 or flutes as shown at 61 or a square cross section as shown at 62.

Minor constructional details may be modified without departing from the scope of the appended claims.

What is claimed is:

1. A roller for a belt conveyor comprising a stationary supporting shaft, a cylindrical casing made of a plastic supporting the belt, supporting end plates provided adjacent each casing end and having a flange to which said casing is abutted, cases connected to said end plates, each case being made up of a primary inner half shell and a secondary outer half shell, said shells being made of cast plastic parts and connected to each other, bearings in said cases and interposed between the case wall and the shaft, each primary and each secondary half shell having a hub member closely surrounding said shaft for forming a bearing surface, the bearing surfaces on said respective half shells being arranged on the opposite sides of said bearing, and a bracing tube interconnecting the two cases and adapted freely to rotate about said shaft.

2. A roller for a belt conveyor according to claim 1, wherein the hub member of the secondary outer half shell has grooves surrounding the shaft for forming a grooved bearing surface.

3. A roller for a belt conveyor comprising a stationary supporting shaft, a cylindrical casing made of a plastic supporting the belt, supporting end plates made of a plastic arranged adjacent each casing end and having a flange to which said casing is abutted, cylindrical skirt members extending from said end plates inwardly of said flanges, reinforcing struts interconnecting said skirt members and said flanges, cases connected to said cylindrical skirt members, each case being made up of a primary inner half shell and a secondary outer half shell, said shells being made of cast plastic and mutually interconnected, bearings in said cases interposed between the case wall and the shaft, each primary half shell and each secondary half shell having a hub member closely surrounding the shaft for forming a bearing surface, the bearing surfaces on the primary and secondary half shells being arranged on the opposite sides of the bearing, and a bracing tube interconnecting the two cases and adapted freely to rotate about the shaft.

4. A roller for a belt conveyor comprising a stationary supporting shaft, a cylindrical casing made of a plastic material supporting the belt, supporting end plates adjacent each casing end and having a flange to which said casing is abutted, apertures on said end plates for the passage of the shaft, a lip bordering said apertures in the end plates, a groove in the shaft in registration with said lip for providing a sealed contact, cases connected to said end plates, each case being made up of a primary inner half shell and a secondary outer half shell, both shells being made of cast plastic parts and being mutually interconnected, bearings in said cases interposed between the case wall and the shaft, each primary and each secondary half shell having a hub member closely encompassing the shaft for forming a bearing surface, the bearing surfaces on the respective shells being arranged on the opposite sides of the bearing, the bearing surface of the secondary half shell being slightly offset from the aperture in the adjacent end plate for defining a dust-collecting chamber between said shell and said secondary half shell, and a bracing tube interconnecting the two cases and adapted freely to rotate about said shaft.

5. A roller for a conveyor belt according to claim 4, wherein cylindrical skirt members extend from the end plates, the cases which accommodate the bearings being fixed to said skirt members, reinforcing struts interconnecting said skirt members to the flange on the end plates, the hub member of the outer secondary half shell of each case having grooves surrounding the shaft for forming a grooved bearing surface.

6. A roller for a belt conveyor comprising a stationary supporting shaft, a cylindrical casing made of a plastic material supporting the belt, supporting end plates each having a peripheral flange, a cylindrical skirt member and reinforcing struts interconnecting said flange and said skirt member, said casing being abutted to the flange on the end plate, cases each of which has a primary inner half shell and a secondary outer half shell, both shells being made of molded plastic material, each primary half shell and each secondary half shell having a rim portion and a hub member, said hub member surrounding the roller shaft for building a bearing surface, a bearing mounted in each case between said half shells, shouldered portions on the rim portions of the half shells for assembling them, a fitting groove in the rim portion of the primary half shell of each case for the engagement of the skirt member of the adjacent end plate, a bracing tube interconnecting the two cases and adapted freely to revolve about said shaft, and a groove formed in the hub member of each primary half shell for the engagement of said bracing tube so that the bracing tube, the half shells of said cases, the end plates and the roller casing form a unitary assembly having a high mechanical strength.

7. A roller for a belt conveyor comprising a stationary supporting shaft, a cylindrical casing made of a plastic material supporting the belt, said casing defining an axial bore having a double conicity, the diameter of each conicity growing from the middle of the casing toward each end, supporting end plates adjacent each casing end and having a flange on which said casing is abutted, cases connected to said end plates, each case being made up of a primary inner half shell and a secondary outer half shell, both shells being constituted by parts made of cast plastic material, said half shells being mutually interconnected, bearings accommodated in said cases and interposed between the case walls and the shaft, each primary half shell and each secondary half shell having a hub member closely surrounding the roller shaft for forming a bearing surface, said bearing surfaces being arranged on the opposite sides of the bearing, and a bracing tube interconnecting said cases and adapted freely to rotate about said shaft.

8. A roller for a belt conveyor according to claim 7, wherein abutment discs distributed over the length of the roller are interposed between the casing and the bracing tube, the outer diameter of said discs growing from the middle of said casing toward its ends.

References Cited in the file of this patent
UNITED STATES PATENTS
2,607,459    Ludwig et al. _____ Aug. 19, 1952